United States Patent Office 2,824,942
Patented Feb. 25, 1958

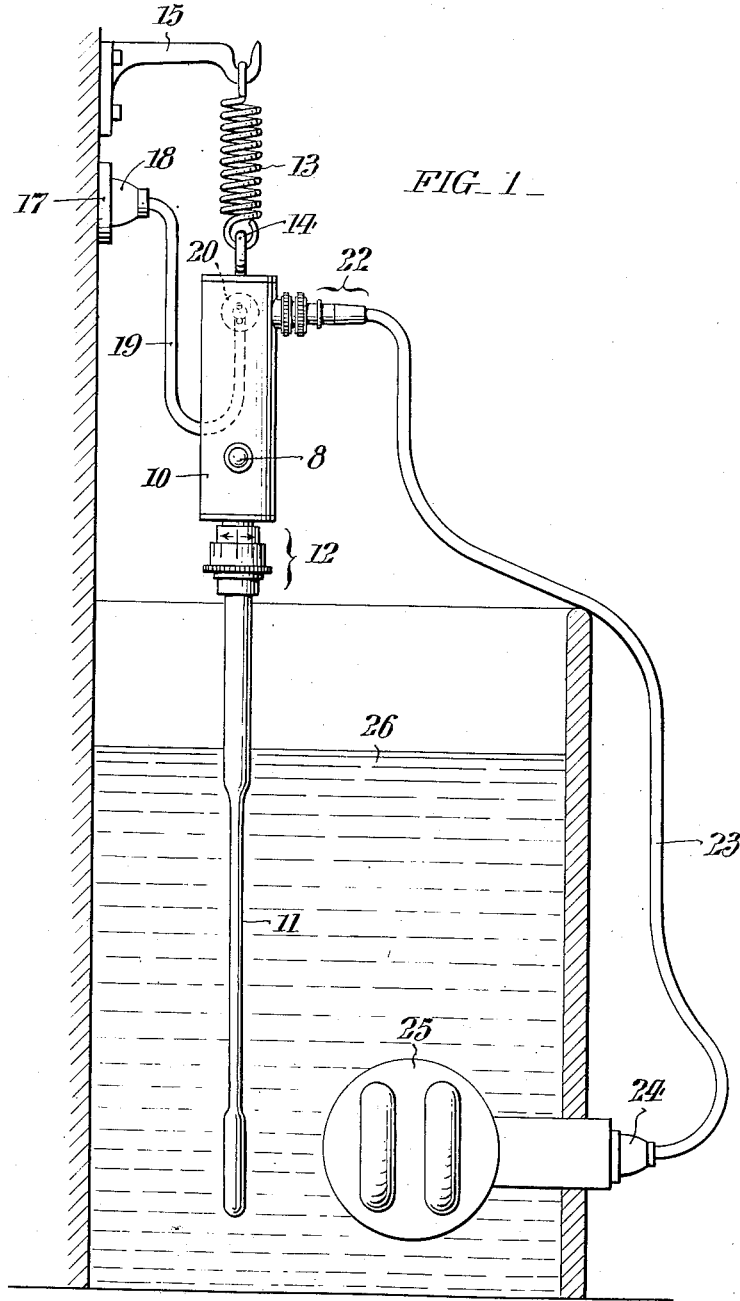

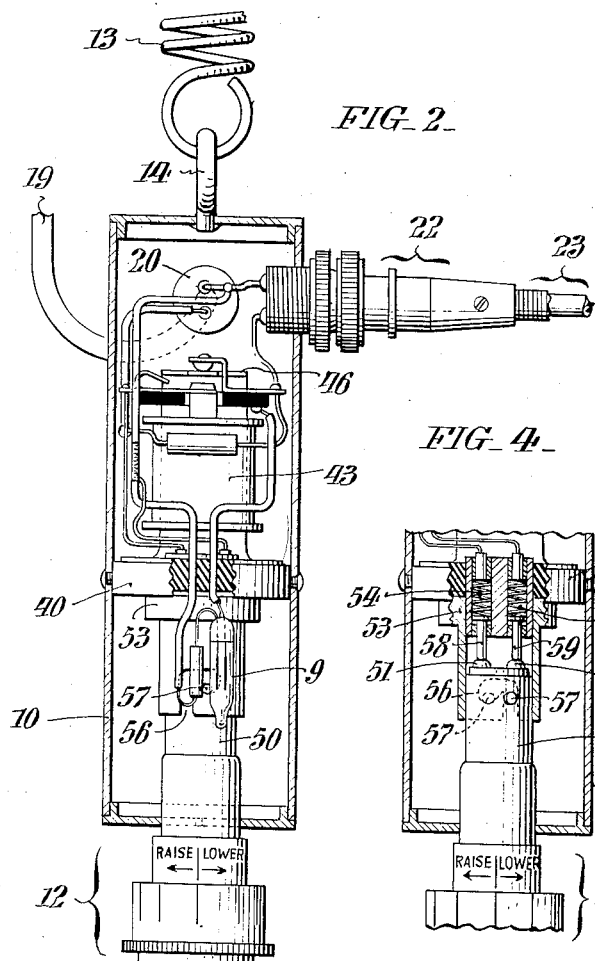
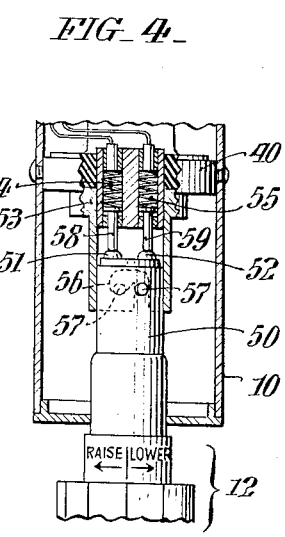
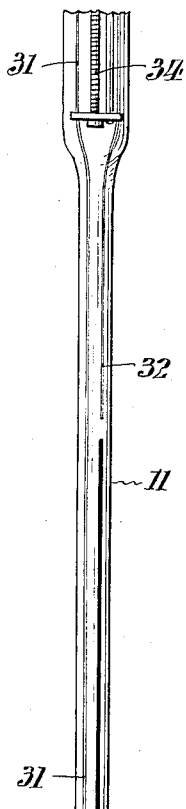
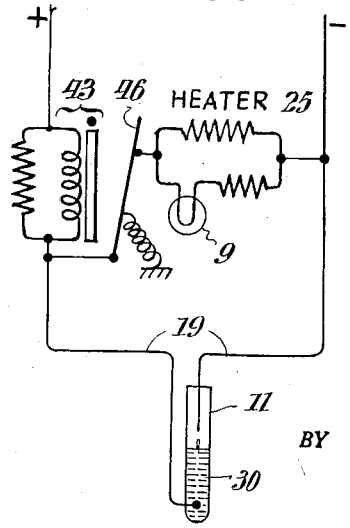

2,824,942

TEMPERATURE REGULATING DEVICE

Hugo Engelhardt, Meadowbrook, and Howard R. Schwartz, Overlook Hills, Pa., assignors to Hugh Engelhardt and J. Leonard Schwartz, doing business as Philadelphia Thermometer Company, Philadelphia, Pa., a partnership Application October 28, 1955, Serial No. 543,556

6 Claims. (Cl. 219—20)

This invention relates to temperature regulating devices and particularly to those used in chemical laboratories and the like where it is desired to maintain a quantity of liquid at a given temperature.

It is a primary object of this invention to provide a compact temperature regulating device which can be used to maintain a given temperature in a quantity of liquid and which indicates when the heating element is in operation.

It is also an object of this invention to provide a temperature regulating device in which the temperature indicating thermometer and the indicator which indicates that the heating unit is in operation can be observed simultaneously.

Other objects and advantages will be apparent from the following description and the drawings of which:

Fig. 1 is a side elevation showing a temperature regulating device made in accordance with the invention in operation in a fluid containing tank;

Fig. 2 is a partial expanded view, partially in cross section, of the temperature regulating apparatus of Fig. 1;

Fig. 3 is a partial view showing the lower portion of the thermostat shown in Fig. 1;

Fig. 4 is a cross sectional view of a portion of the apparatus shown in Fig. 2;

Fig. 5 is a wiring diagram illustrating the electrical features of one embodiment of a temperature regulating device made in accordance with the invention.

The temperature regulating device shown in Fig. 1 comprises a cartridge 10 containing electrical apparatus and connections which will be hereinafter more fully explained, a thermostat 11 connected to the cartridge 10 and immersed in the fluid bath 26, heater 25 connected to the cartridge 10 through heater plug 24, heater wire 23 and heater connection 22, and the power source electrical outlet 17 connected to the cartridge 10 through source plug 18, source wire 19 and source connection 20. The cartridge 10 is suspended from the wall hook 15 through the coil spring 13 and supporting eye 14. The pilot light window 8 covers an electric pilot light 9 which lights up when the heater 25 is in operation. The thermostat 11 is raised and lowered by means of the rotary raising and lowering device 12.

As shown in Fig. 3, the thermostat 11 contains a pool of mercury 30 at the bottom thereof which rises within the thermostat tube 11 when the temperature is increased. The permanent thermostat connecting wire 31 extends down into the pool of mercury. The variable thermostat connecting wire 32 extends into the thermostat tube 11, and its position may be varied by raising or lowering the platform 33 as illustrated in Fig. 2. This is accomplished by rotating the raising and lowering device 12 which rotates the threaded rod 34 to which the platform 33 is threadably attached. The thermostat is set by matching the position of the platform 33 along the thermometer scale 27 with the position of the lower tip of the variable connecting wire 32 above the mercury 30. Thus, the thermometer scale should be corrected so that when the platform 33 is at reading 100° F. the lower tip of the wire 32 is at the point to which the mercury 30 rises in the thermostat tube 11 at 100° F.

The temperature regulating device is so constructed that when the temperature at the bath 26 raises the mercury 30 in the thermostat tube 11 to the point where it touches the variable connecting wire 32, a circuit is closed which automatically turns off the heater 25 and the pilot light 9. When the temperature of the bath 26 drops, the mercury 30 in the tube 11 falls, breaking the connection with the wire 32. When this circuit is opened, the relay switch 46 automatically closes the circuit which turns on the heater 25 and the pilot light 9. Thus, in operation, the desired temperature of the fluid bath 26 is fixed by raising or lowering the platform 33 to the reading on the thermometer corresponding to that temperature and the thermostat 11 is suspended in the bath 26 from hook 15. The heater 25 operates to heat the fluid 26 until the desired temperature is reached; and while it operates, pilot light 9 is on. When the desired temperature in the bath 26 is reached, the heater 25 and the pilot light 9 again go off until the temperature in the bath is lowered below the desired point.

A typical circuit to achieve the desired result is illustrated in the circuit diagram of Fig. 5. It will be appreciated that other circuits may be devised to achieve the same result. As shown in Fig. 5, the thermostat 11 is placed directly across the line 19 in series with relay 43. The heater 25 and pilot light 9, in parallel with each other, are also placed across the line although in series with the relay switch 46. As long as the thermostat connection is opened, the circuit through the heater and pilot light is closed and, when the thermostat circuit is closed, the relay opens the heater and pilot light circuit. The connection between the thermostat tube 11 and the cartridge 10 is shown in Fig. 4, wherein the thermostat plug 50 carrying the thermostat posts 51 and 52 is inserted through an opening at the bottom of the cartridge 10 and fitted in the lower part of the bracket 53. The bracket 53 is provided with a pair of diametrically opposed bayonet slots 56 in which the bayonet slot holding pins 57 are rotatably inserted. The connection is maintained by means of the pins 58 and 59 which are mounted against the springs 54 and 55. The pins 58 and 59 are so situated that the springs are placed in compression when the holding pins 57 are in place in the bayonet slot 56. The bracket 53 is fixed to the spacing block 40 which is fastened to the wall of the cartridge 10.

The invention thus described provides a compact separable unit which will retain a quantity of fluid at a desirable temperature and will indicate visually at all times whether the heating element is in operation. By means of the separable connection of the plug 50 in the bracket 53, various lengths and sizes of thermostats may be employed with the cartridge 10.

It will be apparent to those skilled in the art that various changes other than those referred to above may be made in the invention, and that certain features thereof may be used to advantage independently of the use of other features, all within the spirit of the invention as defined in the annexed claims.

Having thus described our invention, we claim:

1. A temperature indicating device comprising an elongated tubular cartridge, a thermostat having a temperature-sensitive element inserted in the bottom of said cartridge, said temperature-sensitive element being remote from said cartridge, a pair of radially spaced electrical sockets in said cartridge, heating means outside said cartridge and electrically connected to one of said sockets, an electric power source connected to the other of said sockets, a glass covered opening in the side of said cartridge and a pilot light in said cartridge disposed adjacent said opening, said electrical sockets, light bulb and thermostat being electrically connected in said cartridge to supply electric power to said heater and light bulb simultaneously when the thermostat reaches a predetermined temperature and to cut off the supply of electric power thereto when the thermostat falls below said temperature.

2. In a temperature regulating device having a heater and a thermostat actuated by said heater, a cartridge separate from said heater and electrically connected thereto containing the electrical connections for said device, resilient means attached to the top of said cartridge for suspending said device over a fluid containing receptacle and mechanical means for attaching said thermostat to said electrical connections in said cartridge comprising a cylindrical tube affixed in said cartridge having bayonet slots formed therein and a plug attached to said thermostat having pins mounted in the side thereof adapted to fit said bayonet slots.

3. In a temperature regulating device, an elongated tubular cartridge for enclosing the electrical connections of said device, a rigid dielectric platform inserted in said cartridge and affixed thereto, electrical connections from a source of electric power inserted in one side of the platform, coil springs made of an electrically conductive material disposed adjacent and beneath said connections, pins of conductive material disposed beneath said springs and electrically connected therewith, a bracket affixed to said platform, said bracket having a bayonet slot formed therein and an opening in the bottom of said cartridge adapted to receive a thermostat.

4. An electrical connector comprising an elongated tubular cartridge, a rigid dielectric platform inserted in said cartridge and affixed thereto, electrical connections from an electric power source inserted in one side of the platform, coil springs made of an electrically conductive material disposed adjacent and beneath said connections, pins of conductive material disposed beneath said springs and electrically connected therewith and a bracket affixed to said platform, said bracket having a bayonet slot formed therein.

5. In a temperature regulating device, an elongated tubular cartridge for enclosing the electrical connections of said device, temperature indicating and controlling means having one end inserted in said cartridge, a rigid dielectric platform inserted in said cartridge and affixed thereto, electrical connections from a source of electric power inserted in one side of the platform, coil springs made of an electrically conductive material disposed adjacent and beneath said connections, pins of conductive material disposed beneath said springs and electrically connected therewith, a bracket affixed to said platform, said bracket having a bayonet slot formed therein and an opening in the bottom of said cartridge adapted to receive a thermostat.

6. A temperature regulating device comprising a cartridge, heating means outside said cartridge and electrically connected thereto, an electrical relay and relay switch and a light bulb enclosed in said cartridge, a source of electric power connected to said cartridge, electrical connecting means in said cartridge connecting said heating means and said light bulb to said power source and fluid containing temperature indicating and controlling means having one end inserted in said cartridge for operatively connecting said heater and said light bulb to said power source when the fluid in the said temperature indicating and controlling means falls below a predetermined level and for cutting off the power through said heater and said light bulb by means of said relay when the fluid in the temperature indicating and controlling means rises above a predetermined level.

References Cited in the file of this patent
UNITED STATES PATENTS

| | | |
|---|---|---|
| 894,703 | Sanford | July 28, 1908 |
| 2,006,351 | Gebhard et al. | July 2, 1935 |
| 2,087,150 | Hieber et al. | July 13, 1937 |
| 2,190,225 | Vollmer | Feb. 13, 1940 |
| 2,399,402 | Spengler | Apr. 30, 1946 |
| 2,405,881 | Frei | Aug. 13, 1946 |
| 2,480,470 | Hulbert | Aug. 30, 1949 |
| 2,498,884 | Forbes | Feb. 28, 1950 |
| 2,539,541 | Kelley | Jan. 30, 1951 |
| 2,688,683 | Walthert | Sept. 7, 1954 |
| 2,703,871 | Woodhead | Mar. 8, 1955 |
| 2,728,843 | Lightfoot | Dec. 27, 1955 |
| 2,731,615 | Hazen | Jan. 17, 1956 |

UNITED STATES PATENT OFFICE
CERTIFICATE OF CORRECTION

Patent No. 2,824,942                                           February 25, 1958

Hugo Engelhardt et al.

It is hereby certified that error appears in the above numbered patent requiring correction and that the said Letters Patent should read as corrected below.

In the grant, lines 2 and 3, and line 14, and in the heading to the printed specification, lines 4 and 5, name of first assignee, for "Hugh Engelhardt" read -- Hugo Engelhardt --.

Signed and sealed this 3rd day of June 1958.

(SEAL)

Attest:
KARL H. AXLINE

Attesting Officer

ROBERT C. WATSON
Commissioner of Patents